(12) United States Patent
Tay

(10) Patent No.: US 9,309,576 B2
(45) Date of Patent: Apr. 12, 2016

(54) SUGAR CRYSTALLIZATION CONTROL SYSTEM AND METHOD

(71) Applicant: ROCKWELL AUTOMATION TECHNOLOGIES, INC., Mayfield Heights, OH (US)

(72) Inventor: Michael Edward Tay, Georgetown, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 365 days.

(21) Appl. No.: 13/800,839

(22) Filed: Mar. 13, 2013

(65) Prior Publication Data

US 2014/0261396 A1 Sep. 18, 2014

(51) Int. Cl.
*C13B 30/02* (2011.01)
*B01D 9/02* (2006.01)
*B01D 9/00* (2006.01)

(52) U.S. Cl.
CPC ............ *C13B 30/025* (2013.01); *B01D 9/0063* (2013.01); *B01D 9/02* (2013.01); *C13B 30/027* (2013.01)

(58) Field of Classification Search
CPC .. C13B 30/022; C13B 30/025; C13B 30/026; C13B 30/027; C13B 30/02; B01D 9/00; B01D 9/02; B01D 9/0063; B01D 2009/0086; C13K 1/10
USPC ........ 23/295 R, 300, 301; 127/15–17, 58, 60, 127/61
See application file for complete search history.

(56) References Cited

U.S. PATENT DOCUMENTS

| | | | | |
|---|---|---|---|---|
| 3,220,883 A | * | 11/1965 | Howard | 127/16 |
| 3,365,331 A | * | 1/1968 | Miller | B01D 9/0009 127/30 |
| 3,725,127 A | * | 4/1973 | Retalia et al. | 127/16 |
| 3,899,386 A | | 8/1975 | Komiyama et al. | |
| 4,056,364 A | * | 11/1977 | Dmitrovsky et al. | 422/253 |
| 4,263,010 A | * | 4/1981 | Randolph | 23/295 R |
| 4,518,436 A | * | 5/1985 | van der Poel | 127/60 |
| 4,848,321 A | | 7/1989 | Chigusa et al. | |
| 5,047,088 A | * | 9/1991 | Liaw et al. | 127/60 |
| 5,133,807 A | * | 7/1992 | De Cremoux | B01D 9/0022 127/15 |
| 5,223,040 A | * | 6/1993 | de Cremoux | 127/42 |
| 2005/0084939 A1 | * | 4/2005 | Serna-Saldivar et al. | 435/105 |

(Continued)

FOREIGN PATENT DOCUMENTS

CN 1736526 A 2/2006

OTHER PUBLICATIONS

Publication: Grondin-Perez et al, "Supervision of C crystallization in Bois Rouge sugar mill using on-line crystal content estimation using synchronous microwave and refractometric brix measurements", Journal of Food Engineering, vol. 76, Issue 4, Oct. 2006, pp. 639-645.*

(Continued)

*Primary Examiner* — Joseph Drodge
(74) *Attorney, Agent, or Firm* — Fletcher Yoder P.C.

(57) ABSTRACT

The embodiments described herein include one embodiment that provides a method for controlling sugar crystallization. The method includes, during a crystallization process, determining supersaturation of a sugar slurry of syrup and regulating influx of syrup into the sugar slurry to promote sugar crystallization in a closed-loop manner based upon the determined supersaturation.

24 Claims, 6 Drawing Sheets

(56) References Cited

U.S. PATENT DOCUMENTS

2009/0114214 A1* 5/2009 Barata et al. .................. 127/60
2011/0237790 A1* 9/2011 Lee et al. ..................... 536/127

OTHER PUBLICATIONS

Publication: Galvanauskas et al, Dynamic Optimisation of Industrial Sugar Crystallization Process based on a Hybrid (mechanistic+ANN) Model, 2006 International Joint Conference on Neural Networks, Sheraton Vancouver Wall Centre Hotel, Vancouver, BC, Canada, Jul. 16-21, 2006, pp. 2728-2735.*

Publication: Simoglou et al, "On-line monitoring of a sugar crystallization process", Computers & Chemical Engineering, vol. 29, Issue 6, May 15, 2005, pp. 1411-1422.*

Publication: Georgieva et al, Knowledge-based hybrid modeling of a batch crystallization when accounting for nucleation, growth and agglomeration phenomena, Chemical Engineering Science, vol. 58, Issue 16, Aug. 2003, pp. 3699-3713.*

MS. AaMARPALI Ratna Puri; S. Kaur; International Journal of Food Engineering; Effect of Phosphate and Silica on the Rate of Crystallization of Sucrose; vol. 1, Issue 5; 2005, Article 4.

N. Kubota; Effect of Impurities on the Growth Kinetics of Crystals; Department of Chemical Engineering, Iwate University; Cryst. Res. Technol, 36, 2001, 8-10, 749-769.

SeedMaster 2; Crystallization Transmitter and Seeding Device; Process Control; Web: www.processcontrol.hu.

Lajos Rozsa; Suger Crystallization: Look for the Devil in the Details—Part 1.

Lajos Rozsa; Suger Crystallization: Look for the Devil in the Details—Part 2.

Extended EP Search Report Mailed Jan. 19, 2015.

L. Rozsa; On-Line Monitoring of Supersaturation in Sugar Crystallisation; International Sugar Journal; vol. 98, No. 1176, 1996.

L. Rozsa; Sensor Selection: Still an Issue in Sugar Crystallisation Control; Philsutech Phillipine Sugar Technologists Association Convention Proceedings; Aug. 25, 2003-Aug. 29, 2003, Bacalod City, Phillipines.

L. Rozsa; SeedMaster 2: A Universal Crystallization Transmitter and Automatic Seeding Device; International Sugar Journal; vol. 108, No. 1296, Jan. 1, 2006.

L. Rozsa; On-Line Monitoring and Control of Supersaturation and Other Massecuite Parameters in Vacuum Pans: A Control Engineering Approach; International Sugar Journal, vol. 113, No. 1356, Dec. 2011.

P. Georgieva et al. "Application of Feed Forward Neural Networks in Modeling and Control of a Fed-Batch Clystailization Process" pp. 65-70, Mar. 31, 2006.

Office Action in CN Patent Application No. 201410093232.6 Mailed Jun. 23, 2015.

* cited by examiner

BEET SYRUP SOLUBILITY
(g SUCROSE / g WATER)

| T°C | PURITY | | | | | | | | |
|---|---|---|---|---|---|---|---|---|---|
| | 100 | 95 | 90 | 85 | 80 | 75 | 70 | 65 | 60 |
| 65 | 3.06 | 3.04 | 3.01 | 3.00 | 3.05 | 3.17 | 3.30 | 3.62 | 4.07 |
| 70 | 3.25 | 3.20 | 3.16 | 3.16 | 3.21 | 3.33 | 3.57 | 3.94 | 4.50 |
| 75 | 3.46 | 3.40 | 3.37 | 3.38 | 3.44 | 3.63 | 3.90 | 4.35 | 5.50 |
| 80 | 3.69 | 3.63 | 3.61 | 3.62 | 3.70 | 3.93 | 4.29 | 4.82 | 5.72 |
| 85 | 3.94 | 3.88 | 3.85 | 3.86 | 3.94 | 4.23 | 4.70 | 5.32 | 6.38 |

FIG. 3

CANE SYRUP SOLUBILITY
(g SUCROSE / g WATER)

| TEMP | PURITY | | | | | | |
|---|---|---|---|---|---|---|---|
| | 100 | 90 | 80 | 70 | 60 | 50 | |
| 65 | 3.06 | 2.96 | 2.82 | 2.74 | 2.64 | 2.50 | |
| 70 | 3.25 | 3.14 | 2.99 | 2.93 | 2.81 | 2.62 | |
| 75 | 3.46 | 3.33 | 3.20 | 3.11 | 2.97 | 2.76 | |
| 80 | 3.69 | 3.56 | 3.43 | 3.35 | 3.17 | 2.97 | |
| 85 | 3.94 | 3.77 | 3.66 | 3.57 | 3.40 | 3.15 | |

SUGAR CRYSTALLIZATION CONTROL SYSTEM AND METHOD

BACKGROUND

The invention relates generally to sugar crystallization and more particularly to controlling supersaturation during sugar crystallization.

Generally, sugar crystals may be formed in a sugar processing sub-system (e.g., a vacuum pan) when a sugar solution, such as a massecuite or sugar slurry, is supersaturated. The supersaturation degree of the sugar slurry may affect the sugar yield of the vacuum pan and the uniformity in sugar crystal size. Specifically, when the supersaturation degree becomes too high, conglomerates and fines may form. Conglomerates and fines may be undesirable because they may increase the cost of production of sugar. For example, the varied size may increase the difficulty of separating the crystals from the sugar slurry. Accordingly, to achieve higher sugar yields, to more efficiently process/produce sugar, and for easier centrifugation, it may be beneficial to better control the supersaturation degree in the vacuum pan during sugar crystallization.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a method for controlling sugar crystallization, including periodically, during a crystallization process, determining supersaturation of a sugar and regulating influx of syrup into the sugar slurry to promote sugar crystallization in a closed-loop manner based upon the determined supersaturation.

A second embodiment provides a method for controlling sugar crystallization in a closed-loop manner. The method includes determining a size of sugar crystals in a sugar slurry, in which the size of the sugar crystals is based at least in part on an initial size of the sugar crystals, a supersaturation degree of the sugar slurry, a change in time, and a first tuning parameter. The method further includes determining a consistency value of the sugar slurry, in which the consistency value of the sugar slurry is based at least in part on an initial consistency value of the sugar slurry, the size of the sugar crystals, the supersaturation degree of the sugar slurry, a level value of the sugar slurry, and a second tuning parameter. The method further includes determining a purity value of a liquid portion of the sugar slurry, in which the purity value of the liquid portion of the sugar slurry is based at least in part on the level value of the sugar slurry, a brix value of the sugar slurry, a purity value of the syrup, an amount of the liquid portion of the sugar slurry, and a brix value of the liquid portion of the sugar slurry. The method further includes determining the supersaturation value of the sugar slurry, in which the supersaturation value of the sugar slurry is based at least in part on a sugar saturation point of the sugar slurry, the brix value of a liquid portion of the sugar slurry, and a purity of the liquid portion of the sugar slurry. The method further includes controlling a syrup feed valve position, a steam valve position, a vacuum pressure, or any combination thereof based on the determined supersaturation.

A third embodiment provides a method for increasing sugar yield, including periodically, during a crystallization process, determining supersaturation of a sugar slurry and increasing the sugar yield of the sugar slurry by regulating influx of syrup into the sugar slurry and the temperature of the sugar slurry in a closed-loop manner to maintain the supersaturation of the sugar slurry below a threshold supersaturation.

A fourth embodiment provides a method for increasing crystal size uniformity, including periodically, during a crystallization process, determining supersaturation of a sugar slurry and promoting uniform crystal size by regulating influx of syrup into the sugar slurry and the temperature of the sugar slurry in a closed-loop manner to maintain the supersaturation of the sugar slurry below a threshold supersaturation.

A fifth embodiment provides a system for controlling sugar crystallization including a sugar processing subsystem configured to hold a sugar slurry, to add heat to the sugar slurry, and to add syrup to the sugar slurry. The system further includes a brix measuring device configured measure a brix value of the sugar slurry and a temperature sensor configured to measure a temperature of the sugar slurry. The system further includes a batch crystallization controller including a processor programmed to determine a supersaturation of the sugar slurry in a closed-loop manner, in which the supersaturation is based at least in part on a sugar saturation point of the sugar slurry, a brix value of a liquid portion of the sugar slurry, and a purity of the liquid portion of the sugar slurry. The batch crystallization processor is further configured to regulate influx of syrup added to the sugar slurry, in which the influx of syrup added to the sugar slurry is based on the supersaturation of the sugar slurry.

DRAWINGS

These and other features, aspects, and advantages of the present invention will become better understood when the following detailed description is read with reference to the accompanying drawings in which like characters represent like parts throughout the drawings, wherein:

FIG. 3 is a syrup solubility table for beet syrup based on temperature and purity of syrup.

FIG. 4 is a syrup solubility table for cane syrup based on temperature and purity of syrup.

DETAILED DESCRIPTION

Figure 1:
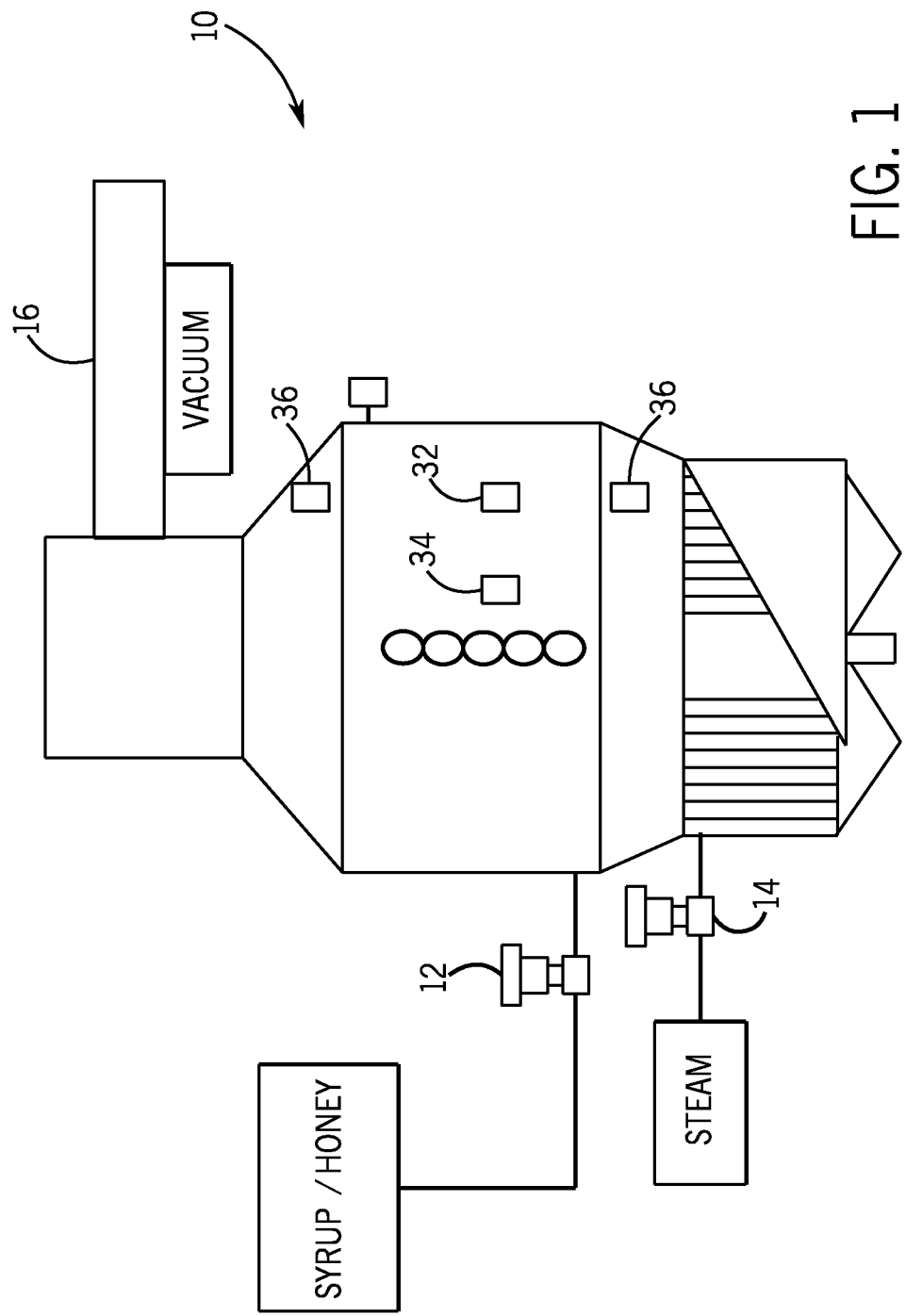
FIG. 1 depicts a diagram of an embodiment of a vacuum pan.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards systems and methods for controlling supersaturation during a sugar crystallization process. The supersaturation degree of a sugar solution, such as a sugar slurry or a massecuite, directly affects the growth rate of sugar crystals. Specifically, the higher the supersaturation degree, the higher the crystal growth rate. However, when the supersaturation degree passes a certain threshold, the size of the sugar crystals may become harder to control because natural crystal seeds may form. As such, the resulting sugar crystals may include both conglomerates (i.e., large crystals) and fines (i.e., small crystals), which may increase the cost of producing sugar. For example, the varying size of the crystals may make it more difficult to separate the sugar crystals from the sugar solution (i.e., sugar slurry or massecuite) resulting in increased sugar left in the molasses. In addition, the varying size may reduce the sugar produced per pan because the conglomerates and fines are commonly melted and recirculated.

Attempts to control supersaturation degree have been based on the sugar processing sub-system (e.g., vacuum pan) inventory conditions (i.e., the conditions of the entire sugar processing sub-system). For example, this may include making basing supersaturation calculations on the brix of the pan. However, as crystallization begins, solid sugar crystals begin to form in the mother liquor. As used herein, the mother liquor is the liquid portion of the sugar slurry. Thus, the characteristics of the mother liquor, such as purity and brix, may vary from the characteristics of the pan as a whole.

Accordingly, the present disclosure provides a method for controlling sugar crystallization. The method includes periodically, during a crystallization process, determining supersaturation of a sugar slurry of syrup and regulating influx of syrup into the sugar slurry to promote sugar crystallization in a closed-loop manner based upon the determined supersaturation. Specifically, the present disclosure provides systems and methods for accurately modeling/calculating the supersaturation degree, in a closed-loop manner, based on the characteristics of the mother liquor. In other words, with a better modeled and controlled supersaturation degree, more uniformly sized crystals may be formed resulting in a higher sugar yield, a more efficient sugar processing/production, and easier centrifugation (i.e., separating out the crystals).

By way of introduction, FIG. 1 illustrates an embodiment of a sugar processing sub-system. In the depicted embodiment, the sugar processing subsystem is a vacuum pan 10 that may be used in a sugar crystallization process. As depicted, the vacuum pan 10 includes a syrup feed valve 12, a steam valve 14, and a vacuum 16. The syrup feed valve 12 may be configured to control the amount of syrup flowing into the vacuum pan. Specifically, the syrup feed valve 12 may be configured to be set at anywhere between 0% open to 100% open. In some embodiments, other constraints may limit the positions the syrup feed valve 12 may be set at. The steam valve 14 and the vacuum 16 may be configured to control the temperature of the vacuum pan. Similar to the syrup feel valve 12, the steam valve 14 may be configured to be set anywhere between 0% open to 100% open. Accordingly, when a higher temperature is desired, the steam valve 14 may be opened more to enable more steam to enter the vacuum pan 10. In addition, the vacuum 16 may also be configured to control the temperature of the vacuum pan 10 by changing the pressure in the vacuum pan 10. For example, the pressure may be decreased to decrease the temperature and vice versa. In some embodiments, one of the steam valve 14 or the vacuum 16 may be held constant enabling a single variable to control temperature. Additionally, constraints may also be placed on the steam valve 14 and the vacuum that may limit the range of values each may be set at.

Figure 2:
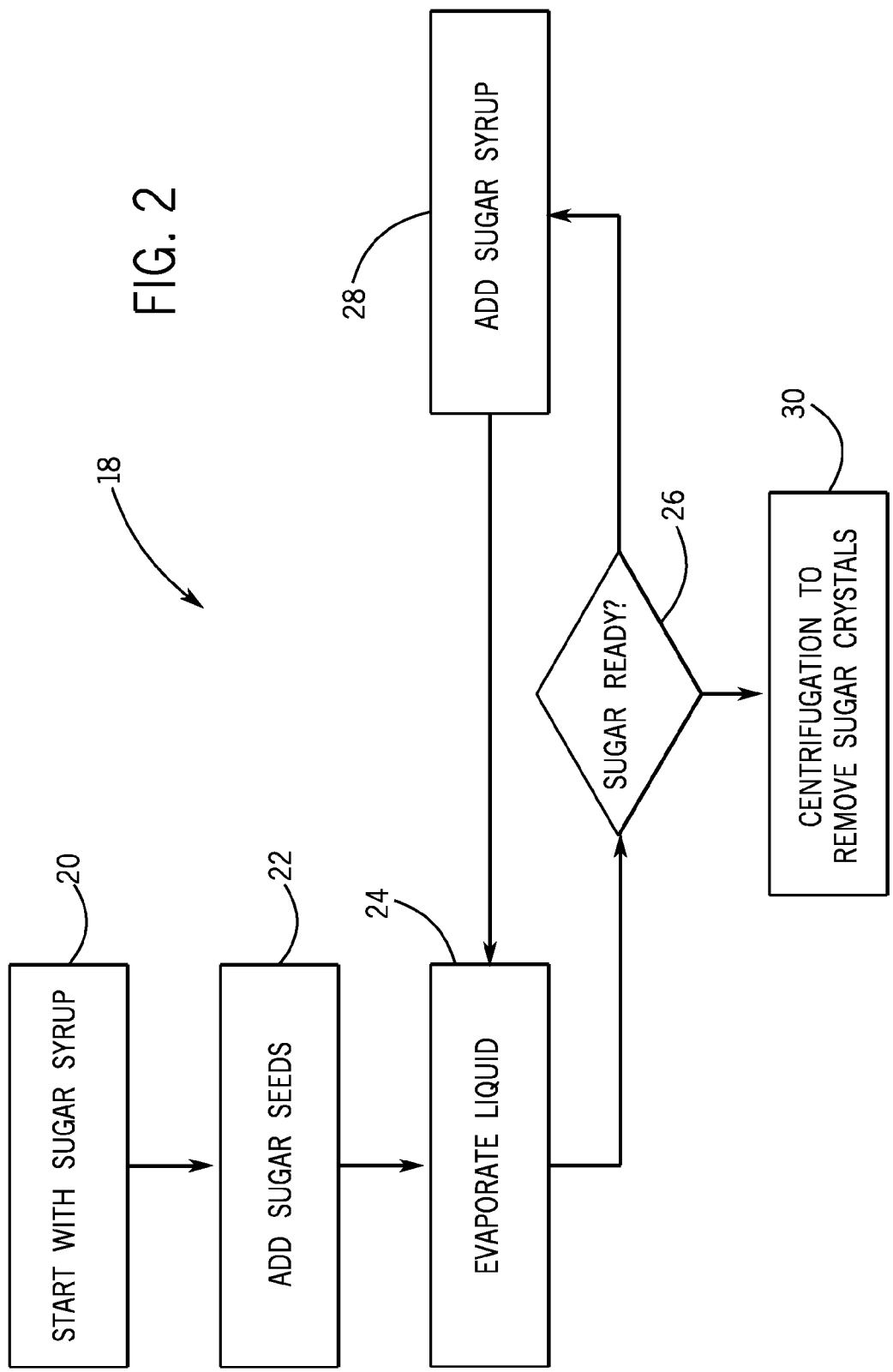
FIG. 2 is a flow diagram depicting an embodiment of a sugar crystallization process.

Using the vacuum pan 10 described, there are a variety of methods for the production of sugar crystals. Accordingly, FIG. 2 depicts an embodiment of a sugar crystallization process 18. The process 18 begins with a sugar syrup or liquor (block 20). The sugar syrup may be derived from beets or sugar cane which may result in different properties. For example, as shown in FIG. 3 and FIG. 4, the sugar saturation differs between cane syrup and beet syrup. As depicted in FIG. 3 and FIG. 4, the sugar saturation depends on the temperature and purity of the sugar syrup. In addition, the brix and the purity of the sugar syrup may be determined. In some embodiments, the brix may be determined through a refractometer, and the purity may be determined by dividing the polarization (i.e., apparent sugar content as a mass percent) by the brix and multiplying by 100. Next, sugar seeds are added to the syrup to form a massecuite or a sugar slurry (block 22). The sugar seeds may be small sugar crystals such as powdered sugar.

Once the seeds are added, the liquid in the massecuite or mother liquor is evaporated by raising the temperature (block 24). As described above, this may be accomplished by increasing the steam into the vacuum pan 10 via the steam valve 14 or increasing the pressure in the vacuum pan 10 via the vacuum 16. As the liquid begins to evaporate, the sugar concentration in the massecuite increases. At a certain point, the massecuite becomes supersaturated and crystallization may begin. When the supersaturation degree is below a threshold, sugar crystals may form around the sugar seeds. Once the supersaturation passes the threshold the sugar crystallization may become more difficult to control. Specifically, nucleation may begin. In other words, the massecuite may begin to naturally form small crystals, which may result in conglomerates and fines. Accordingly, in some embodiments described herein, it is desirable to maintain the supersaturation between 1.01-1.05, 1.05-1.10, 1.10-1.15, 1.15-1.20, 1.20-1.25, 1.25-1.50, or any combination thereof.

As the sugar crystals grow, the operator of the vacuum pan 10 may monitor the sugar crystal size to determine if the crystals are the desired size based on a target crystal size (decision block 26). If not, more sugar syrup may be added to the massecuite to increase the amount of sugar in the vacuum pan (block 28) and the evaporation process may continue (block 24). When the operator finally decides that the sugar crystals are an appropriate size, the sugar crystals may be remove from the sugar slurry through centrifugation (block 30). As an alternative to starting with the sugar syrup and adding sugar seeds, the vacuum pan 10 may start with a molasses, such as B Magma, which may already contain sugar crystals. Accordingly, the sugar crystals in the molasses may act as the sugar seeds. In addition, at the end of the sugar crystallization, the purity and consistency of the sugar slurry, as well as the sugar crystal size may be measured.

Turning back to FIG. 1, the vacuum pan 10 may also includes sensors to monitor the conditions inside the vacuum pan 10. As depicted, the vacuum pan 10 includes a temperature sensor 32, two pressure sensors 36, and a brix measuring device 34, such as a refractometer. The two pressure sensors 36 may be configured to determine the level (i.e., the change of pressure between the two pressure sensors 36), which is proportional to the weight of the sugar slurry. Accordingly, the vacuum pan 10 may be configured to measure the temperature of the vacuum pan 10, the brix of the sugar slurry, and the change of pressure from the bottom to the top of the vacuum pan 10, which is proportional to the weight of the sugar slurry.

Figure 5:
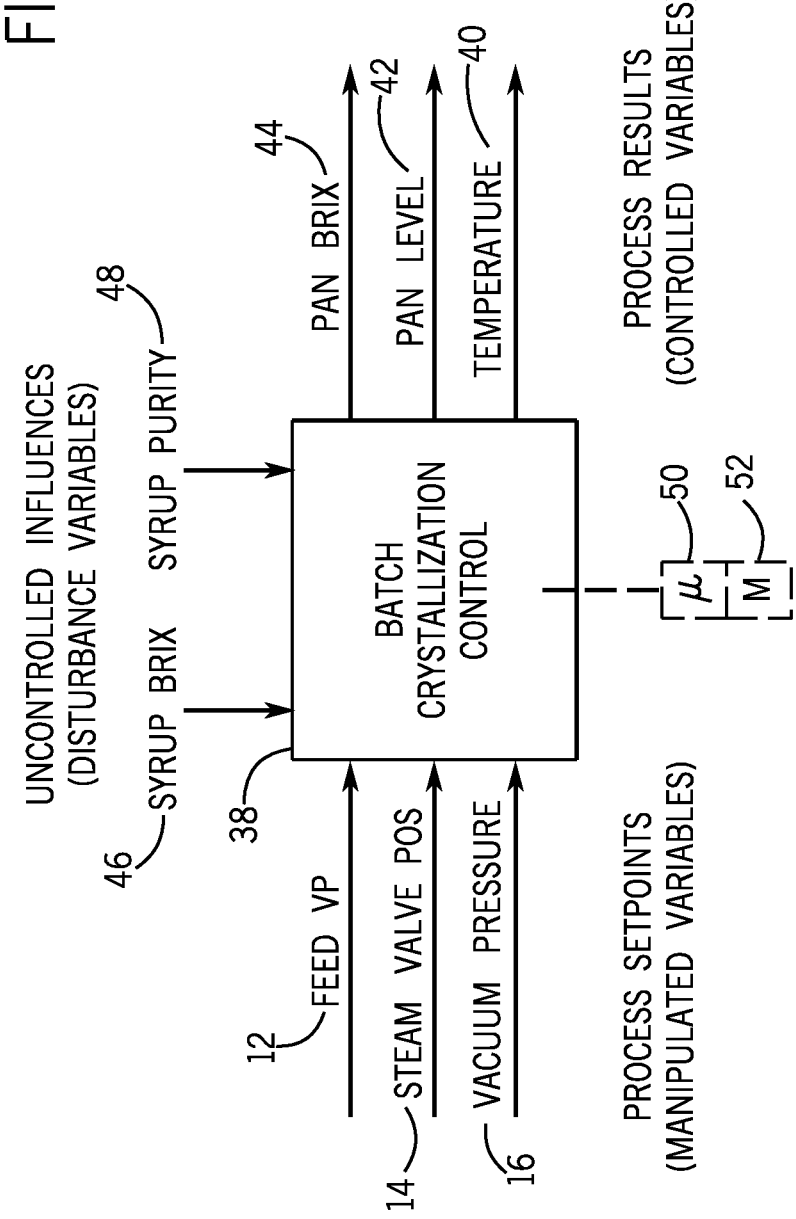
FIG. 5 depicts a block diagram of an embodiment of a batch crystallization controller including process setpoints, uncontrolled influences, and process results.

Based on these measurements, the operator of the vacuum pan may control the supersaturation of the sugar slurry. In one embodiment, as shown in FIG. 5, the operator may use a batch crystallization controller 38 to facilitate controlling the process results (i.e., temperature 40, brix 42, and level of the pan 44) by manipulating the process setpoints (i.e., the syrup feed valve 12, the steam valve 14, and the vacuum 16). In addition, as depicted, there are uncontrolled influences that may affect the process results. Specifically, these include properties of the syrup, such as the syrup brix 46 and the syrup purity 48. Accordingly, the batch crystallization controller 38 may include a processor 50 that may be used in processing computer instructions, and a memory 52 that may be used to store computer instructions and other data.

Figure 6:
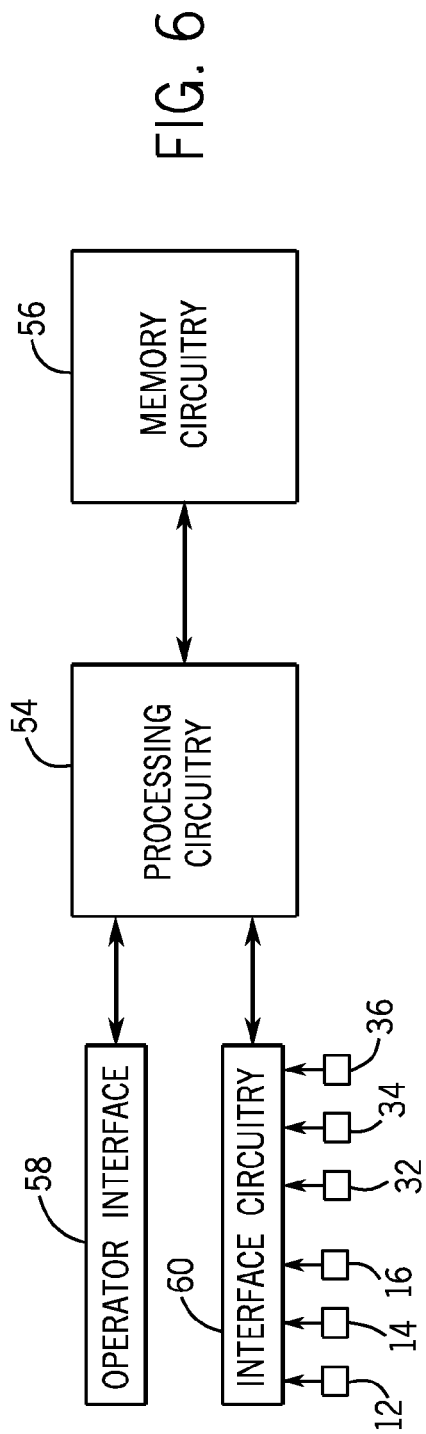
FIG. 6 depicts a block diagram of an embodiment of a processing circuitry, a memory circuitry, an interface circuitry, and an operator interface used in the batch crystallization controller of FIG. 5.

FIG. 6 depicts one embodiment of the batch crystallization controller 38. Specifically, the processor 50 may be implemented with a processing circuitry 54 and the memory 52 may be implemented with a memory circuitry 56. In addition, the batch crystallization controller 38 may include an operator interface 58, which may be configured to enable an operator to select settings and monitor the conditions of the vacuum pan 10. Accordingly, the operator interface 58 may include a graphical user interface. For example, measurement values (e.g., brix, temperature, or level) or calculation values (e.g., purity, consistency, or supersaturation) may be displayed on the operator interface 58 via the graphical user interface. Furthermore, the batch crystallization controller 38 may include an interface circuitry 60. The interface circuitry 60 may be configured to facilitate communication to various actuators (e.g., the syrup feed valve 12, the steam valve 14, and the vacuum 16) and from various sensors (e.g., the pressure sensors 36, the temperature sensor 32, and the brix measurement device 34).

Figure 7:
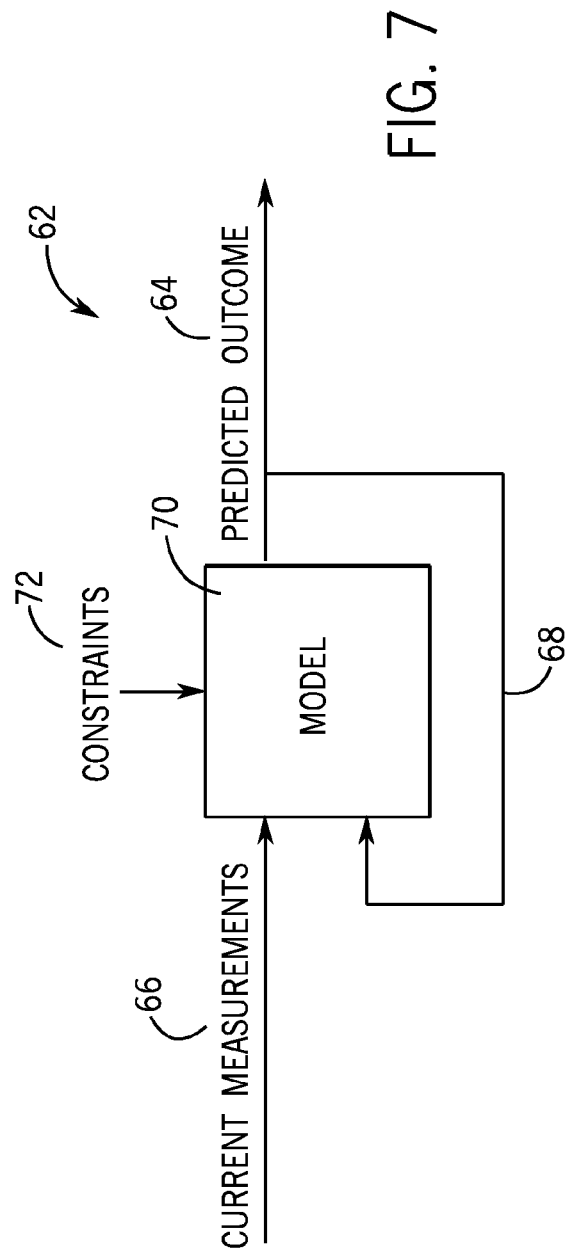
FIG. 7 is a block diagram depicting a model predictive control (MPC).

As described above, the characteristics of the mother liquor in the vacuum pan 10 may change as crystallization progresses. Accordingly, one method to model the dynamic properties of the mother liquor is through the use of model predictive controls (MPC) 62, as seen in FIG. 7. As depicted, the MPC 62 is configured to predict an output 64 (e.g., supersaturation) based on the current measurements 66 (e.g., temperature, brix, and level of the sugar slurry), the past predicted outcome 68 (e.g., purity, consistency, and brix of the mother liquor), a model 70, and constraints 72 (e.g., supersaturation goal or valve limits). Accordingly, the predicted outcome 64 may be determined in a close-loop manner.

Figure 8:
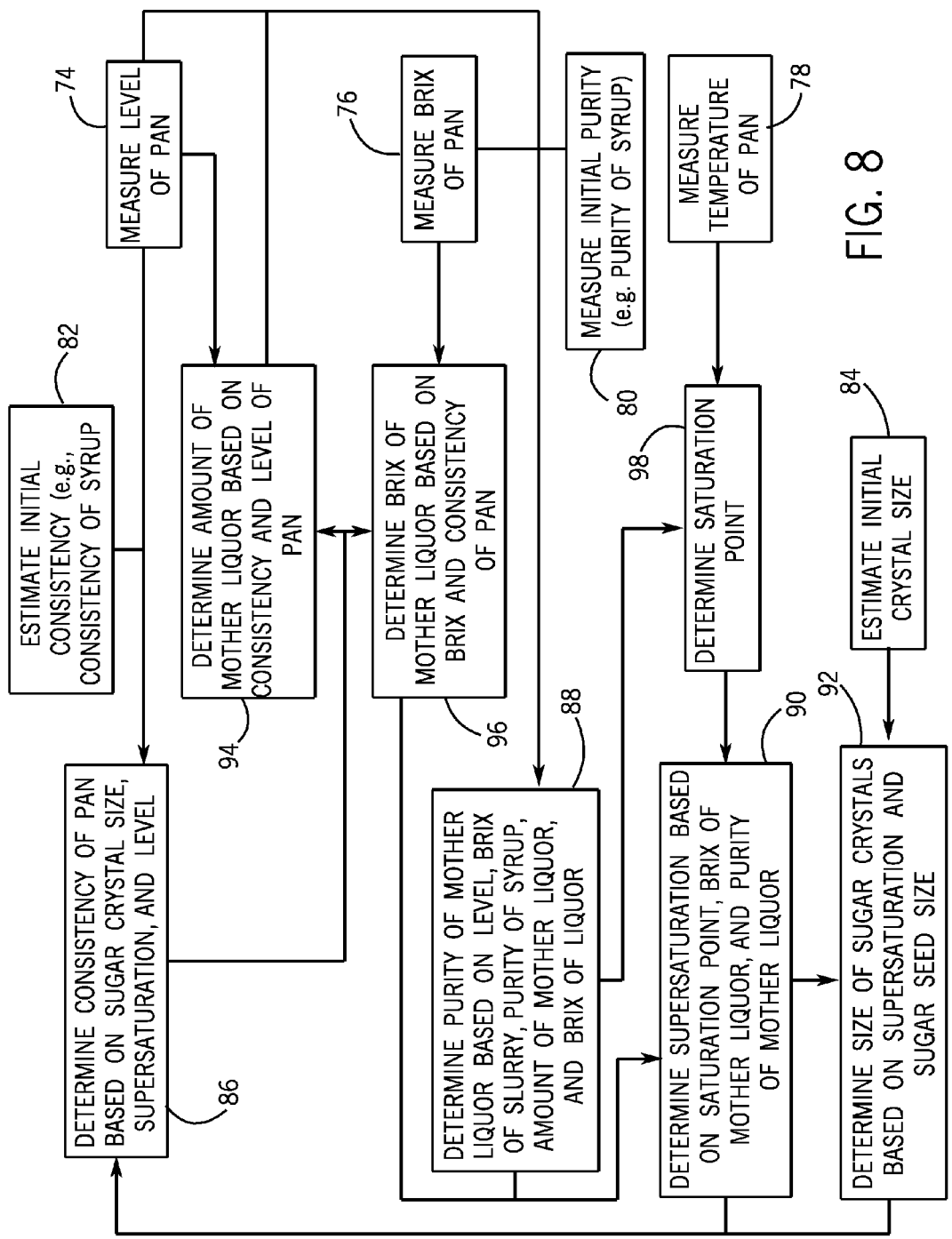
FIG. 8 is a flow diagram depicting a closed-loop control of supersaturation degree based on a size of the sugar crystals, a purity of the liquor, and a consistency of the vacuum pan.

FIG. 8 depicts an embodiment using the MPC 62 to predict the supersaturation of the vacuum pan 10 in a closed-loop manner during the sugar crystallization process 18. Specifically, in the embodiment depicted, a mathematical model is used to calculate and control the consistency of the pan, the purity of the mother liquor, the supersaturation, and the size of the sugar crystals in a real-time closed-loop manner. Accordingly, the described model may utilize the batch crystallization controller 38 in FIG. 5 to perform the calculations described below.

As described above, measurements (i.e., level of pan 74, brix of pan 76, and temperature of pan 78) are made on the vacuum pan 10. In some embodiments, the measurements may be made every 1-5, 5-10, 10-15, 15-20, or 25-60 seconds. In addition, initial parameters of the vacuum pan 10 are measured or estimated. Specifically, an initial purity 80 may be measure, and an initial crystal size 84 and an initial consistency 82 may be estimated. As will be described in more detail below, the estimated initial crystal size 84 and consistency 82 may be used as tuning parameters to better match the long term crystallization performance. As used herein, purity is the weight percent of sugar in the solids and consistency is the weight percent of solid sugar in the pan. It should be appreciated, that the syrup has zero consistency because it is entirely liquid. Similarly, as described above, the final parameters of the vacuum pan 10, including the crystal size, the purity of the pan, and the consistency of the pan, may be measured. Thus, based on the measurements and estimates described above, the batch crystallization controller 38 is configured to determine the consistency of the pan 86, the purity of the mother liquor 88, the supersaturation 90, and the size of the sugar crystals 92 during the crystallization process 18 in a closed-loop manner.

In some embodiments, the consistency of the pan 86 may be modeled/determined by the following equation:

$$\text{Consistency}_n = \frac{(\text{Consistency}_{n-1} * \text{Level}_{n-1}) + k_{Consitency} * \Delta\text{time} * (MA_{n-1})^2 * \text{Supersaturation}_{n-1}}{\text{Level}_n} \quad (1)$$

As seen in equation (1), the consistency 86 is based on a previous consistency (e.g., initial consistency 82), the level of the pan 74, the size of the sugar crystals, and the supersaturation 90. In addition, $k_{Consistency}$ is a consistency constant that may be used as a tuning parameter, which will be described in more detail below. Based on the consistency 86 determined and the measured level of the pan 74, the amount of mother liquor 94 may be determined by the following equation:

$$\text{Liquid}_n = (100\% - \text{Consistency}_{n-1}) * \text{Level}_{n-1} \quad (2)$$

In addition, based on the consistency 86 determined and the measured brix of the pan 76, the brix of the mother liquor 96 may be determined by the following equation:

$$\text{Brix}_{Liquid\,n} = (\text{Brix}_{Pan\,n-1} - \text{Consistency}_{n-1})/(100\% - \text{Consistency}_{n-1}) \quad (3)$$

Next, the purity of the mother liquor 88 may be modeled/determined. As described above, the vacuum pan 10 may be started in different manners, which result in different equations for calculating the purity of the mother liquor 88. For example, when the vacuum pan 10 starts with syrup and sugar seeds are added, the purity of the mother liquor 88 may be determined by the following equation:

$$\text{Purity}_{Liquid\,n} = (\text{Level}_{n-1} * \text{Brix}_{Pan}) * (100\% - \text{Purity}_{Syrup}) / \text{Liquid}_n / \text{Brix}_{Liquid\,n} \quad (4)$$

As seen in equation (4), the purity of the mother liquor is based on the level of the pan 74, the brix of the pan 76, the purity of the syrup 80, the amount of mother liquor 94, and the brix of the mother liquor 96. Alternatively, when the vacuum pan 10 starts with a molasses, the purity of the mother liquor 88 may be determined by the following equation:

$$\text{Purity}_{Liquid\,n} = (\text{Level}_0 * \text{Brix}_{Molasses}) * (100\% - \text{Purity}_{Molasses}) + (\text{Level}_{n-1} * \text{Brix}_{Pan} - \text{Level}_0 * \text{Brix}_{Molasses}(100\% - \text{Purity}_{Syrup})) / \text{Liquid}_n / \text{Brix}_{Liquid\,n} \quad (5)$$

It should be appreciated that equation (5) takes into account that the purity of the molasses may be different from the purity of the syrup. As seen in equation (5), the purity of the mother liquor 88 is based on the initial level of the pan, the brix of the molasses, the purity of the molasses, the level of the pan 74, the brix of the pan 76, the purity of the syrup 80, the amount of mother liquor 94, and the brix of the mother liquor 96. After the purity of the mother liquor is determined, the saturation point 98 may be determined through one of the lookup tables depicted in FIG. 3 and FIG. 4. As depicted in FIG. 3 and FIG. 4, the saturation point is determined as a function of the purity of the mother liquor 88 temperature of the pan 78.

The supersaturation 90 may then be modeled/determined based on the following formula:

$$\text{Supersaturation}_n = \frac{\text{BRIX}_{Liquidn} * \text{Purity}_{Liquidn}}{(100\% - \text{Brix}_{Liquidn}) * \text{Sugar Saturation Point}} \quad (6)$$

As seen in equation (6), the supersaturation 90 is based on the brix of the mother liquor 96, the purity of the mother liquor 88, and the sugar saturation point 98. Closing the loop, the size of the sugar crystals 92 is modeled/determined by the following formula:

$$MA_n = MA_{n-1} + k_{MA} * \Delta time * (MA_{n-1})^2 * \text{Supersaturation}_{n-1} \quad (7)$$

As seen in equation (7), the size of the sugar crystals 92 is based on the previous size of the sugar crystals, the change in time, and supersaturation. In addition, $k_{MA}$ is a crystal size constant that may be used as a tuning parameter.

As described above, multiple tuning parameters are present to better match the crystallization model to the actual crystallization performance. These include the initial crystal size 84, the initial consistency 82, $k_{Consistency}$, and $k_{MA}$. Accordingly, the tuning parameters may be adjusted to better match the measured final outcomes (i.e., measured crystal size, purity, and consistency). In addition, this enables the described model to be adapted to a wide variety of sugar production sub-systems (e.g., vacuum pan 10).

The above model (i.e., equations 1-7), enable the supersaturation degree to be determined throughout the nucleation (i.e., crystallization) process in a closed-loop. Accordingly, based on the initial parameter measurements (i.e., initial purity), estimations (i.e., initial consistency and initial crystal size), and the intermediate measurements (i.e., temperature of the pan, brix of the pan, and level of the pan), an operator is able to better control the process setpoints (i.e., syrup feed valve, steam valve, and vacuum) to achieve the desired supersaturation degree. The described model may also be adjusted based on the final parameter measurements (i.e., final purity, final consistency, and final crystal size) to better match the actual crystallization performance, which further enables the described model to be adapted to various sugar production sub-systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling sugar crystallization, comprising, during a crystallization process:
   determining a first brix value of a liquid portion of a sugar slurry, wherein the first brix value describes sugar content of the liquid portion of the sugar slurry;
   determining a first purity value of the liquid portion of the sugar slurry, wherein the first purity value describes weight percentage of sugar among solids dissolved in the liquid portion of the sugar slurry;
   determining a supersaturation degree of the sugar slurry based at least in part on the first brix value and the first purity value; and
   regulating influx of syrup into the sugar slurry to promote sugar crystallization in a closed-loop manner based upon the supersaturation degree.

2. The method of claim 1, comprising:
   measuring a second brix value of the sugar slurry using a sensor, wherein the second brix value describes sugar content of the sugar slurry;
   wherein the first brix value and the first purity value are determined based at least in part on the second brix value.

3. The method of claim 2, wherein determining the first brix value of the liquid portion of the sugar slurry comprises:
   determining a consistency value of the sugar slurry, wherein determining the consistency value of the sugar comprises:
   estimating an initial consistency value of the sugar slurry; and
   estimating an initial sugar crystal size;
   wherein the initial consistency value of the sugar slurry and the initial crystal size are tuning parameters; and
   determining the first brix value based at least in part on the consistency value of the sugar slurry.

4. The method of claim 2, wherein determining the first purity value of the liquid portion of the sugar slurry comprises:
   measuring a level value of the sugar slurry;
   determining a second purity value of the syrup, wherein the second purity value describes weight percentage of sugar among solids dissolved in the syrup;
   determining an amount of the liquid portion of the sugar slurry; and
   determining the first purity value based at least in part on the level value, the second purity value, and the amount of the liquid portion of the sugar slurry.

5. The method of claim 1, wherein the supersaturation degree is a ratio between 1.01-1.05, 1.05-1.10, 1.10-1.15, 1.15-1.20, 1.20-1.25, or 1.25-1.50.

6. The method of claim 1, comprising controlling a temperature of the sugar slurry to regulate the supersaturation degree.

7. The method of claim 6, wherein controlling the temperature of the sugar slurry comprises at least one of controlling a flow rate of a heat source and controlling a vacuum pressure of the sugar slurry.

8. A method for controlling sugar crystallization in a closed-loop manner, comprising:
   determining a size of sugar crystals in a sugar slurry, wherein the size of the sugar crystals is determined based at least in part on an initial size of the sugar crystals, a supersaturation degree of the sugar slurry, a change in time, and a first tuning parameter;

determining a consistency value of the sugar slurry, wherein the consistency value of the sugar slurry is determined based at least in part on an initial consistency value of the sugar slurry, the size of the sugar crystals, the supersaturation degree, a level value of the sugar slurry, and a second tuning parameter;

determining a first brix value of a liquid portion of the sugar slurry, wherein the first brix is determined based at least in part on a second brix of the sugar slurry and the consistency value;

determining a purity value of the liquid portion of the sugar slurry, wherein the purity value of the liquid portion of the sugar slurry is determined based at least in part on the level value of the sugar slurry, the second brix value of the sugar slurry, a purity value of a syrup supplied to the sugar slurry, an amount of the liquid portion of the sugar slurry, and the first brix value of the liquid portion of the sugar slurry;

determining the supersaturation degree of the sugar slurry, wherein the supersaturation degree of the sugar slurry is determined based at least in part on a sugar saturation point of the sugar slurry, the first brix value of the liquid portion of the sugar slurry, and the purity value of the liquid portion of the sugar slurry; and controlling a syrup feed valve position, a steam valve position, a vacuum pressure, or any combination thereof based on the supersaturation degree.

9. The method of claim 8, wherein controlling the syrup feed valve position comprises regulating an influx of syrup into the sugar slurry.

10. The method of claim 8, wherein controlling the steam valve and the vacuum pressure comprises regulating a temperature of the sugar slurry.

11. The method of claim 8, wherein the amount of the liquid portion of the sugar slurry is determined based at least in part on the consistency value of the sugar slurry and the level value of the sugar slurry.

12. The method of claim 8, comprising estimating the initial size of the sugar crystals and the initial consistency value of the sugar slurry.

13. The method of claim 12, comprising:
measuring a final size of the sugar crystals;
measuring a final purity value of the liquid portion of the sugar slurry;
measuring a final consistency value of the sugar slurry;
wherein the initial size of the sugar crystals, the initial consistency value of the sugar slurry, the first tuning parameter, the second tuning parameter, or any combination thereof is adjusted to match the determined size of the sugar crystals to the measured final size of the sugar crystals, the determined purity value of the liquid portion of the sugar slurry to the measured final purity value of the liquid portion of the sugar slurry, and the determined consistency value of the sugar slurry to the measured final consistency value of the sugar slurry.

14. A method for controlling sugar crystallization, comprising, during a sugar crystallization process;
determining a first brix value of a liquid portion of a sugar slurry, wherein the first brix value describes sugar content of the liquid portion of the sugar slurry;
determining a first purity value of the liquid portion of the sugar slurry, wherein the first purity value describes weight percentage of sugar among solids dissolved in the liquid portion of the sugar slurry;
determining a supersaturation degree of a sugar slurry based at least in part on the first brix value and the first purity value; and regulating temperature of the sugar slurry in a closed-loop manner to maintain the supersaturation degree of the sugar slurry below a threshold.

15. The method of claim 14, comprising:
measuring a second brix value of the sugar slurry, wherein the second brix value describes sugar content of the sugar slurry;
wherein the first brix value and the first purity value are determined based at least in part on the second brix value.

16. The method of claim 14, wherein the supersaturation degree is a ratio between 1.01-1.05, 1.05-1.15, 1.15-1.25, or 1.25-1.50.

17. A system configured to control sugar crystallization, comprising:
a sugar processing subsystem configured to hold a sugar slurry, to add heat to the sugar slurry, and to add syrup to the sugar slurry;
a brix measuring device configured measure a first brix value of the sugar slurry;
a temperature sensor configured to measure a temperature of the sugar slurry; and
structure for determining purity of the liquid portion of the sugar slurry during the sugar processing;
a batch crystallization controller configured to:
determine a supersaturation degree of the sugar slurry in a closed-loop manner, wherein the supersaturation degree is based at least in part on a sugar saturation point of the sugar slurry, a second brix value of a liquid portion of the sugar slurry, and a purity of the liquid portion of the sugar slurry, wherein the second brix value and the purity of the liquid portion of the sugar slurry are determined based at least in part on the first brix value of the sugar slurry; and
regulate influx of syrup added to the sugar slurry, the temperature of the sugar slurry, or both based on the supersaturation degree of the sugar slurry.

18. The system of claim 17, comprising:
a first pressure sensor configured to measure a pressure at the bottom of the sugar slurry; and
a second pressure sensor configured to measure a pressure at the top of the sugar slurry;
wherein the batch crystallization controller processor is configured to determine a level value of the sugar slurry based on the pressure difference between the pressure measured at a bottom of the sugar slurry and the pressure measured at a top of the sugar slurry.

19. The system of claim 17, wherein the batch crystallization controller processor is configured to determine the purity of the liquid portion of the sugar slurry based at least in part on the level value of the sugar slurry, the first brix value of the sugar slurry, a purity value of the syrup, an amount of the liquid portion of the sugar slurry, and the second brix value of the liquid portion of the sugar slurry.

20. The system of claim 17, wherein the batch crystallization controller is configured to determine the second brix value of the liquid portion of the sugar slurry based at least in part on a consistency value of the sugar slurry.

21. The system of claim 17, wherein the controller is configured to determine the sugar saturation point of the sugar slurry based at least in part on the measured temperature of the sugar slurry and the purity of the liquid portion of the sugar slurry.

22. The system of claim 21, comprising a sensor configured to measure a second brix value of the sugar slurry, wherein the second brix value describes sugar content of the sugar slurry;

wherein the batch crystallization controller is configured to determine the first brix value based at least in part on the second brix value and to determine the first purity value based at least in part on the second brix value.

23. The system of claim 21, wherein the batch crystallization controller is configured to:
   determine a consistency value of the sugar slurry, by:
      estimating an initial consistency value of the sugar slurry; and estimating an initial sugar crystal size;
   determine the first brix value based at least in part on the consistency value of the sugar slurry.

24. The system of claim 21, wherein the batch crystallization controller is configured to:
   determine a level value of the sugar slurry;
   determine a second purity value of the syrup, wherein the second purity value describes weight percentage of sugar among solids dissolved in the syrup;
   determine an amount of the liquid portion of the sugar slurry; and
   determine the first purity value based at least in part on the level value, the second purity value, and the amount of the liquid portion of the sugar slurry.

* * * * *